(12) United States Patent
Hallqvist

(10) Patent No.: US 6,279,812 B1
(45) Date of Patent: Aug. 28, 2001

(54) METHOD FOR PRODUCING ROTATIONAL-SYMMETRICAL ARTICLES OF SHEET METAL WITH DOUBLE CURVED SURFACE AND VARYING THICKNESS OF MATERIAL

(75) Inventor: Mats Hallqvist, Grästorp (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 09/142,665

(22) PCT Filed: Oct. 30, 1997

(86) PCT No.: PCT/SE97/01818

§ 371 Date: Sep. 11, 1998

§ 102(e) Date: Sep. 11, 1998

(87) PCT Pub. No.: WO99/22903

PCT Pub. Date: May 14, 1999

(51) Int. Cl.[7] ................................................. B21D 21/00
(52) U.S. Cl. ........................ 228/141.1; 228/144; 219/104
(58) Field of Search ................................. 228/141.1, 144, 228/152; 219/83, 78.01, 117.1, 81, 104, 105

(56) References Cited

U.S. PATENT DOCUMENTS 5,221,045   6/1993   McCaninch et al. .................... 239/1

FOREIGN PATENT DOCUMENTS 653060    3/1979   (SU) .
1026907   7/1983   (SU) .

Primary Examiner—M. Alexandra Elve
(74) Attorney, Agent, or Firm—Ostrolenk, Faber, Gerb & Soffen, LLP

(57) ABSTRACT

A method for producing rotational-symmetrical sheet metal articles with double-curved shape and varying thickness, particularly rocket nozzles, in which a number of sheet metal part-blanks in flat condition are cut to partially circular ring-like shape, whereupon said part-blanks are bent to the desired curvature and welded together to form a blank of the article for final machining. According to the invention the part-blanks are formed by welding together a number of strip-like sheet metal pieces with different thickness of material in flat condition along their straight edges in side-by-side relationship to form a sheet metal plate with a width corresponding to the whole length of the article and with stepwise decreasing thickness of material from one side to the other of said plate, whereupon this sheet metal plate is cut to the shape of a nozzle part-blank with partially circular ring-like shape, and said nozzle part-blank then is bent, and said part-blanks are welded together along their adjacent straight and non-parallel sides to the final blank of the article, which blank finally is subjected to finishing machining, if necessary.

2 Claims, 1 Drawing Sheet

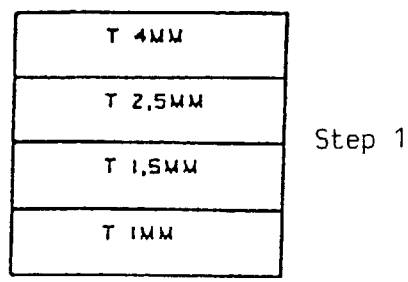
Step 1
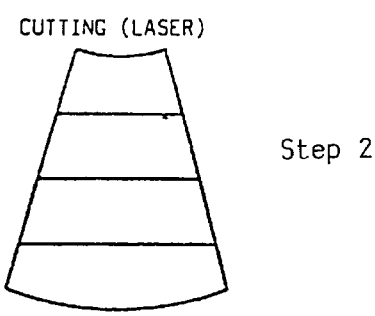
Step 2
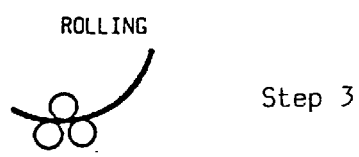
Step 3
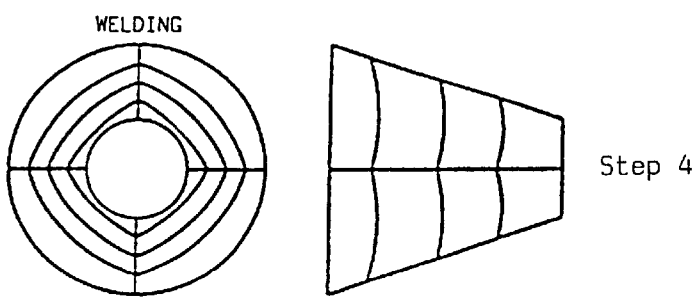
Step 4
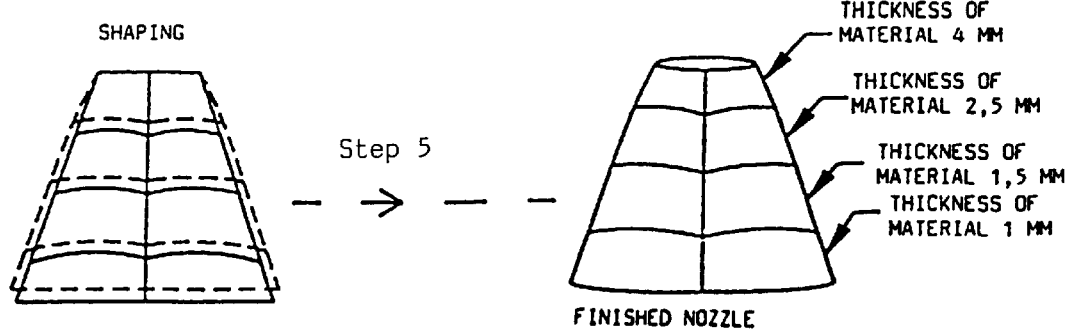
Step 5

METHOD FOR PRODUCING ROTATIONAL-SYMMETRICAL ARTICLES OF SHEET METAL WITH DOUBLE CURVED SURFACE AND VARYING THICKNESS OF MATERIAL

BACKGROUND OF THE INVENTION

1. Field of the Invention

The invention relates to a method for producing rotational-symmetrical articles of sheet metal with double curved surface and varying thickness, particularly conical or bell-shaped articles such as rocket nozzles, in which a number of sheet metal part-blanks in flat condition are cut to partially circular ring-like shape, whereupon said sheet metal part-blanks thus cut are bent to the desired curvature about the intended axis of symmetry and welded together to form a blank of the article for final machining.

2. Descriptionn of the Related Art

The purpose of a rocket nozzle is to expand and accelerate a flow of gas to high velocity and thereby provide a propulsion thrust on the rocket.

The rocket nozzles must also be cooled, which can be done in either of three ways, viz. by regenerative cooling, radiation cooling or by covering the hot side of the nozzle wall with heat protective material. In the case of radiation-cooled nozzles the wall is a single layer structure. Such radiation-cooled nozzles or nozzles provided with heat protective material with conical or bell-shape and varying thickness of material have hitherto been produced by cutting a number of subpieces in flat condition from a plate with a thickness of material of for instance 4 mm, which are then bent to the desired curvature in respect of the axis of symmetry of the intended article, which subpieces are then put together to a closed ring shape and, if necessary, subjected to a shaping operation to obtain the double-curved form. Several similar ring bodies with different thickness of material are produced and finally put together in the longitudinal direction of the article in a predetermined sequence.

This method of manufacturing rocket nozzles suffers from a number of problems. Thus, the initial cutting of the subpieces requires very great accuracy for obtaining a perfect fit at the places of the joint. Joining of the different ring bodies to each other requires complicated tooling and control equipment adapted individually to each size of the ring bodies and the nozzles.

In many cases such nozzles are to be shaped with decreasing thickness of material from the smallest to the greatest cross section in order not to give the nozzle greater strength and thereby weight than what is required to withstand the pressures existing inside and outside the nozzle and other stresses. To obtain this the subpieces or the ring bodies are subjected to machining, preferably chip removal to obtain a progressive change in the thickness of material. This is time-consuming and costly.

SUMMARY OF THE INVENTION

The object of the present invention now is to eliminate the above-mentioned drawbacks and to achieve a method of manufacture which is easier to carry out and results in less waste of material and in which the chip removal can be avoided.

According to the invention this object is achieved in that the sheet metal part-blanks are formed by welding together a number of strip-like sheet metal pieces with different thickness of material in flat condition along their straight edges in side-by-side relationship to form a sheet metal plate with a width which in principle corresponds to the whole length of the article or the nozzle and with stepwise decreasing thickness of material from one side to the other of said plate, whereupon this sheet metal plate is cut to the shape of a nozzle part-blank with partially circular ring-like shape, and said nozzle part-blank then is bent in respect to the axis of symmetry of the nozzle, and in that said part-blanks are welded together along their adjacent straight and non-parallel sides to the final blank of the article, which blank finally is subjected to finishing machining, if necessary.

BRIEF DESCRIPTION OF THE DRAWINGS

A non-limiting example of the invention will now be described with reference to the accompanying drawing, which shows a simplified flow chart of the rocket nozzle according to the invention.

DETAILED DESCRIPTION OF THE PREFERRED EMBODIMENT

According to the invention a number of strip-like sheet metal pieces with thickness of material are welded together in flat condition along their straight edges in side-by-side relationship (four pieces in the example shown) to form a combined sheet metal plate with a width which in principle corresponds essentially to the whole length of the article or the nozzle and with stepwise decreasing thickness of material from one side to the other, for instance from 4 to 1.5 mm. Then this sheet metal plate is cut, for instance by laser to the shape of a nozzle part-blank with partially circular ring-like shape. The nozzle part-blanks are cut out in a fixed manner, so that the part with smaller cross-section of the finished nozzle will have the greatest thickness of material. After that the nozzle part-blanks are bent in respect of the axis of symmetry of the article, and a necessary number of nozzle part-blanks (four part-blanks in the example shown) are joined by welding along their straight and non-parallel sides (along the generatrix of the finished nozzle) to the final blank of the rocket nozzle, which blank can be subjected to necessary finishing machining thereafter, if desired, to obtain the intended bell-shape of the rocket nozzle.

However, it is to be noted that the joining of the strip-like sheet metal pieces by welding is done in such way that the finished bell-shaped rocket nozzle will have a smooth inside.

With the invention, it is possible to produce rocket nozzles with a height of from about 700 to 2500 mm and with a diameter at the outlet end of up to about 2500 mm.

The method according to the invention does not require any complicated tooling, since the welding-together of the strip-like sheet metal pieces with different thicknesses of material is done in flat condition, and the nozzle part-blanks are welded in the direction of the generatrix of the object and not along an arc requiring complex guiding.

It is obvious that it is possible to produce other articles than rocket nozzles with the method according to the invention, such as tanks for liquid or gas, bulbs for hulls of ships and so forth.

What is claimed is:

1. A method for producing rotationally-symmetrical sheet metal aarticles having a double-curved shape and varying thickness, particularly conical or bell-shaped articles, in which a number of flat sheet metal part-blanks are cut into a partially circular ring shape, whereupon said sheet metal part-blanks thus cut are bent into a desired curvature about an intended axis of symmetry and welded together to form a blank for final machining, wherein:

the sheet metal part-blanks are each formed by welding together a number of strip sheet metal pieces of different thickness along their straight edges in side-by-side relationship to form a sheet metal plate with a width which corresponds to a whole length of one of the articles and having a stepwise decreasing thickness of material from one side to the other side of said sheet metal plate, whereupon said sheet metal plate is cut into a particularly circular ring shape, and then bent along the axis of symmetry of the article, and wherein the sheet metal part-blanks are welded together along their adjacent straight and non-parallel sides to form the blank for the article.

2. A method as recited in claim 1, wherein said sheet articles comprise rocket nozzles.

* * * * *